J. GRAY.
Base Burning Stove.
No. 3,044. Reissued July 21, 1868.
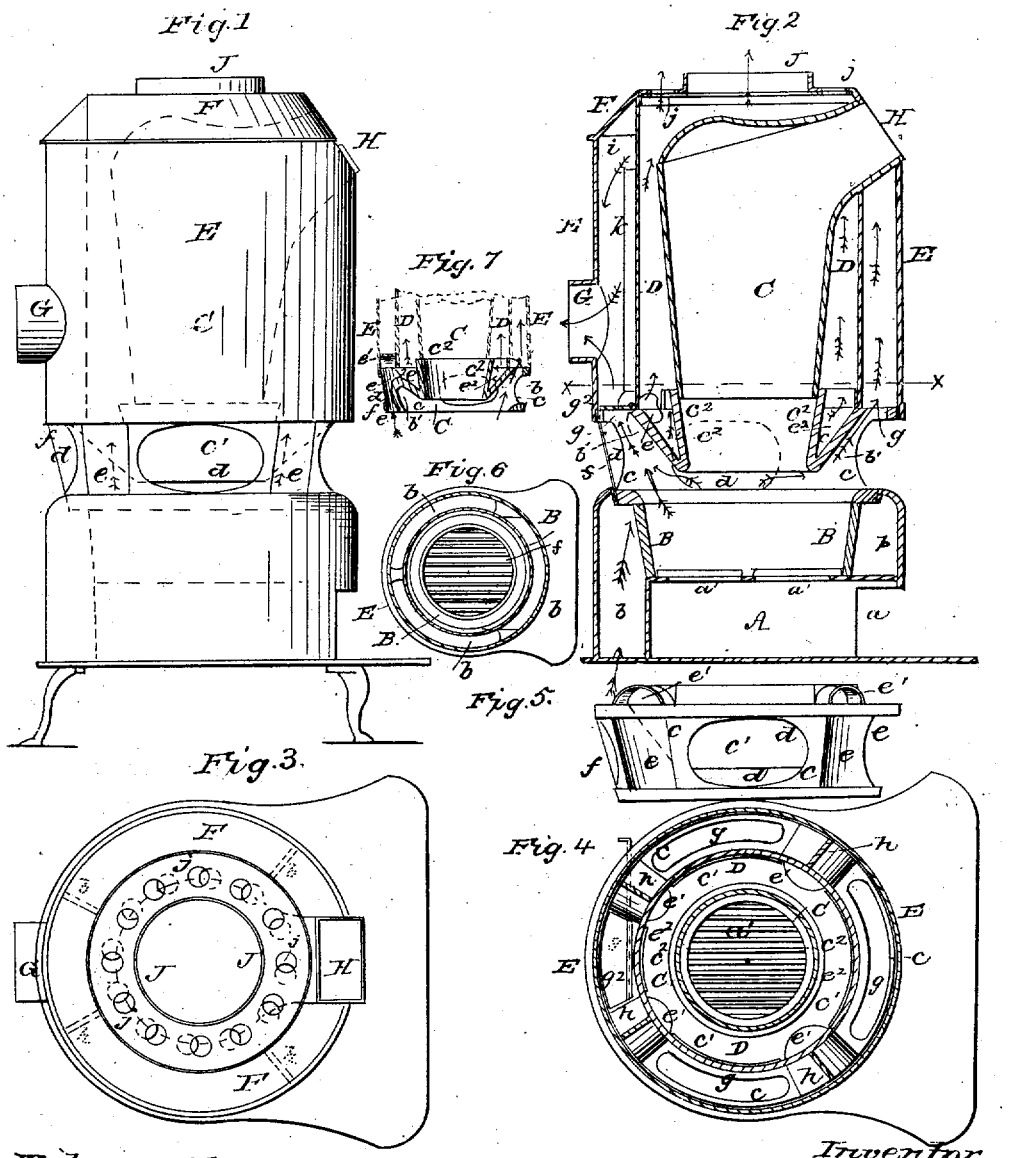
Witnesses
R. G. Haskins
C. Shaft
Inventor
James Gray
by his Atty
Morris Turnbull & Lawrence
N. PETERS. Photo-Lithographer, Washington, D. C.

United States Patent Office.

JAMES GRAY, OF ALBANY, NEW YORK.

*Letters Patent No.* 44,719, *dated October* 18, 1864; *reissue No.* 3,044, *dated July* 21, 1868.

IMPROVEMENT IN BASE-BURNING STOVES.

The Schedule referred to in these Letters Patent and making part of the same.

TO ALL WHOM IT MAY CONCERN:

Be it known that I, JAMES GRAY, of Albany, in the county of Albany, and State of New York, have invented certain new and useful Improvements in Base-Burning Stoves and Furnaces; and I do hereby declare that the following is a full, clear, and exact description thereof, reference being had to the accompanying drawings, making a part of this specification, in which—

Figure 1 is a side elevation of my improved stove or furnace.

Figure 2 is a diametrical section through the same.

Figure 3 is a top view.

Figure 4 is a section taken in the horizontal plane indicated by red line *x x* in fig. 2.

Figure 5 is a side view of the perforated case, containing illuminating-windows, air-passages, and the door-opening.

Figure 6 is a horizontal section through the fire-pot, showing the surrounding inlet-passages for cold air.

Figure 7 is a reduced sectional view of fig. 5, showing one of the air-passages and door-opening.

Similar letters of reference indicate corresponding parts in the several figures.

This invention relates to improvements on that class of stoves and furnaces known as base-burners, wherein combustion takes place at the base of a body of coals, and, as the coals are consumed, the superincumbent mass gradually settles into the fire-chamber, and thus keeps up a constant fire, without the necessity of frequently supplying fuel.

To enable others skilled in the art to make and use my invention, I will describe one practical mode of carrying it into effect.

In the accompanying drawings, A represents the ash-pit, of which *a* is the front door, and *b* a cool-air space, surrounding this pit, for the purpose of conducting air from the outside of the stove or furnace, through the outer shell of the same, to be heated, as will be hereinafter described.

B is the fire-pot, which is mounted upon the ash-pit A, and which surrounds the grate $a'$, as shown in figs. 2, 4, and 6. Above this fire-pot B is an annular combustion-chamber, $b'$, which is surrounded by a perforated case, *c*, the openings in which are to be used for illumination and for the radiation of heat, also a portion of the same as door-openings and air-passages, which chamber $b'$ surrounds an upwardly-flaring jacket, $c^1$, shown in figs. 2 and 7. This jacket $c^1$ is united at its base to a diaphragm, $c^2$, which latter forms the lowermost end of the supply-chamber C, as shown in fig. 2. The case *c*, which forms the outer jacket of the combustion-chamber, is constructed with horizontal openings *d* through it, and vertical cool-air passages *e*, which latter conduct air from the chamber *b* upward, and thence through horizontal arched spaces $e^1$ into the annular air-chamber $e^2$, between the jacket $c^1$ and diaphragm $c^2$.

The cool-air passages in casing *c* are formed in the periphery of this casing, which latter may be covered outside with sheet iron, or other suitable material, represented by *f*, in figs. 1, 2, 5, and 7. By this arrangement of air-passages it will be seen that the external air enters (at the base of the stove) the cool-air space *b* outside of the ash-pit, passes up through several air-passages in casing *c*, thence into the annular air-chamber $e^2$, where it becomes highly heated, and ascends, taking the course indicated by the red arrows in figs. 2 and 7, between the cylinder C and the intermediate cylinder D I prefer the above-described mode of conducting the external cool air through the outer shell of my furnace into the periphery of the casing *c*, for the purpose of warming the same, because it is the best form to attach a conductor or "cold-air box" to from outside the building in which the stove or furnace stands, thus giving the furnace a constant and abundant supply of cool, fresh air, to be warmed and distributed through the apartment. If the supply of air is to be taken from the room in which the furnace stands, other ways will do it. For example, it may be done by leaving off the coverings *f*, or they may be made of Gothic or other form, grated or open work, so as to allow free ingress of air, which will pass rapidly into the annular chamber $e^2$, as before described. This latter plan would prevent the lowermost part of the furnace from being comparatively cool, but, in either case, the operation of warming the air will be as effectual, though the quality of the air warmed will not be so pure.

The products of combustion ascend from the fire-pot and combustion-chamber through oblong openings *g g g*, which are between the air-passages $e^1$, when the damper $g^2$ is closed, and when this damper is open, the products of combustion also pass up through the opening which was closed by said damper. The chamber between the cylinder D and outer case E is subdivided by vertical partitions *h h*, which latter do not extend entirely to the top, F, of the stove or furnace, but terminate at the point represented in fig. 2, so as to leave an annular unobstructed space, *i*, from which the products of combustion pass down into the space formed above the damper $g^2$. When this damper is open, the draught will take the direct course indicated in fig. 2, in blue arrows. When this damper is closed, the products of combustion ascend into the annular smoke-flue *i*, at the top of the stove or furnace, and thence pass down between the two back partitions *h h*, to and through the escape-pipe G, which is in that subdivision directly over the damper $g^2$.

The top plate of the stove or furnace is adapted for receiving the hot-air pipe, J, for conducting the heated air into upper apartments, and it is also adapted for receiving a register, *j*, as shown in figs. 2 and 3, by means of which the heated air can be let out directly into the room containing the stove or furnace.

The fuel is supplied to the chamber C, after starting the fire in pot B, through a side opening, H, which is, in practice, kept closed during the operation of the stove or furnace.

It will be seen, from the above description, that the cool air passing in at the bottom of the stove or furnace is kept in contact with highly-heated surfaces until it escapes either through the register *j*, or into the hot-air pipe J. The diaphragm and jacket $c^1$ $c^2$ are so arranged over the fire-pot B that they are heated by the fire impinging on their lower sides, while their upper sides or surfaces are exposed to the cooling action of the air before it rises into the annular air-chamber of the upper portion of the stove or furnace.

The fire-pot B can be supplied with coal, before starting the fire, through one of the horizontal openings, *d*, in the case *c*, which opening should be provided with a door, either made solid or having a register or a mica light, or both, in it.

The mica windows, covering the openings *d* in the case *c*, are intended for purposes of illumination and radiation, and may be constructed in any desired form.

Having described my invention, what I claim as new, and desire to secure by Letters Patent, is—

1. In a furnace with a fuel-magazine which is sustained free from the grate, and so arranged that the inflamed gases may burn in a free space, I claim so constructing such furnace that the products of combustion rising from the fire-chamber will be conducted toward the top of the furnace through flues which are formed by cylinders D and E, and partitions *h*, and which are arranged around an ascending warm-air passage, substantially as and for the purposes described.

2. In a furnace with a fuel-magazine which is sustained free from the grate, and so arranged that the inflamed gases may burn in a free space, I claim the outer case *c*, constructed with horizontal openings *d* and air-passages $e^1$, substantially as and for the purposes described.

3. In a furnace with a fuel-magazine which is sustained free from the grate, and so arranged that the inflamed gases may burn in a free space, I claim the construction of case *e*, with horizontal openings *d*, vertical openings *e*, and horizontal openings $e^1$, through it, substantially as and for the purposes described.

4. The outer case *c*, constructed with openings *d*, and horizontal air-passages leading from the same into the annular air-chamber $e^2$, in combination with a fuel-magazine which is supported free from the grate, and so constructed that the inflamed gases may burn in a free space, as they are evolved from the entire outer surface of the incandescent pile of coals, substantially as described.

5. The arrangement of the damper $g^2$, in combination with the vertical chambers formed by the walls C, D, and E, and a depressed fire-pot B, substantially as described.

6. In a furnace with a fuel-magazine which is sustained free from the grate, and so arranged that the inflamed gases may burn in a free space, I claim jacketed diaphragm $c^1$ $e^2$, applied at the base of the fuel-magazine, substantially as described.

7. In a furnace with a fuel-magazine which is sustained free from the grate, and so arranged that the inflamed gases may burn in a free space, I claim air-passages *b e* $e^1$ $e^2$, in combination with flues *b'*, *i*, and G, operating substantially as described.

8. In a furnace with a fuel-magazine which is sustained free from the grate, and so arranged that the inflamed gases may burn in a free space, I claim case *c*, in combination with the jacketed diaphragm $c^1$ $c^2$ and fuel-magazine C, substantially as described.

9. In a furnace with a fuel-magazine which is sustained free from the grate, and so arranged that the inflamed gases may burn in a free space, I claim the combination of the fuel-magazine C, the intermediate cylinder D, and the outer cylinder E, substantially as described.

10. In a furnace with a fuel-magazine which is sustained free from the grate, and so arranged that the inflamed gases may burn in a free space, I claim the cylinders C, D, and E, in combination with air-escape pipe J, and smoke-escape G, arranged and operating substantially as described.

11. In a furnace with a fuel-magazine which is sustained free from the grate, and so arranged that the inflamed gases may burn in a free space, I claim the combination of the fuel-magazine C and the intermediate cylinder D, with the jacketed diaphragm $c^1$ $c^2$ and openings $e^1$ $e^2$, substantially as described.

12. In a base-burning air-heating furnace, I claim the annular flue *i*, surrounding and over the supply-cylinder C, in combination with the combustion-chamber *b* and jacketed diaphragm, substantially as described.

13. In a furnace with a fuel-magazine which is sustained free from the grate, and so arranged that the inflamed gases may burn in a free space, I claim the manner, substantially as described, of introducing and passing cool air into the periphery of the case *c*, and across the flue-space or annular combustion-chamber *b'*, substantially as set forth.

14. In a base-burning air-heating furnace, having its magazine free from the grate, I claim the window or doorway opening leading into the combustion-chamber, through which the condition of the fire can be seen and regulated, substantially as described.

15. In a furnace with a fuel-magazine which is sustained free from the grate, and so arranged that the inflamed gases may burn in a free space, I claim constructing the top plate F of the same with a central opening for the escape of heated air, and also with a feed-door or passage leading to the fuel-magazine, substantially as described.

16. In a furnace with a fuel-magazine which is sustained free from the grate, and so arranged that the inflamed gases may burn in a free space, I claim the combination of the annular combustion-chamber *b'*, the jacketed diaphragm $c^1$ $c^2$, and the horizontal openings *d* through the case *c*, the latter being covered with mica for the purpose of illumination and radiation, substantially as described.

17. The central opening J, for the escape of heated air, in combination with a fuel-magazine which is sustained free from the grate, and so arranged that the inflamed gases may burn in a free space, as they are evolved from the entire upper surface of the incandescent pile of coals, substantially as described.

18. In a furnace with a fuel-magazine which is sustained free from the grate, and so arranged that the inflamed gases may burn in a free space, I claim the central opening J, in combination with the jacketed diaphragm $c^1$ $c^2$, substantially as and for the purposes described.

19. In an air-heating base-burning furnace, having its fuel-magazine sustained free from the grate, I claim a door-opening, *d*, leading into the fire-chamber above the fire-pot B, substantially as described.

20. Making the jacketed diaphragm smaller at its base or lower end than it is at its upper end, substantially as shown.

21. The arrangement of a jacketed diaphragm over a grate, *a'*, which is of a larger area than the bottom of said diaphragm, substantially as described.

JAMES GRAY.

Witnesses:

T. W. STEVENS,

WM. GRAY.